United States Patent
Goral

(10) Patent No.: US 6,753,651 B1
(45) Date of Patent: Jun. 22, 2004

(54) EMERGENCY BALLAST WITH BATTERY HEATER

(75) Inventor: Jerzy M. Goral, Cordova, TN (US)

(73) Assignee: The Bodine Company, Inc., Collierville, TN (US)

( * ) Notice: Subject to any disclaimer, the term of this patent is extended or adjusted under 35 U.S.C. 154(b) by 0 days.

(21) Appl. No.: 10/427,462

(22) Filed: May 1, 2003

Related U.S. Application Data

(60) Provisional application No. 60/376,864, filed on May 1, 2002.

(51) Int. Cl.[7] .............................. H05B 37/00; H02J 7/00
(52) U.S. Cl. ........................ 315/86; 315/117; 315/309; 307/64; 307/66; 362/20
(58) Field of Search .......................... 315/86, 117, 171, 315/309; 307/64, 66; 362/20

(56) References Cited

U.S. PATENT DOCUMENTS

| | | |
|---|---|---|
| 3,852,652 A * | 12/1974 | Jasinski ...................... 320/150 |
| 4,650,729 A | 3/1987 | Nakamura et al. ............. 429/61 |
| 4,667,140 A | 5/1987 | Sweetman ................... 318/696 |
| 4,738,906 A | 4/1988 | Sanders ....................... 429/120 |
| 4,899,085 A | 2/1990 | Kimura et al. .............. 315/116 |
| 4,926,106 A | 5/1990 | Tanis ............................. 320/35 |
| 5,004,953 A | 4/1991 | McDonald ..................... 315/86 |
| 5,362,942 A | 11/1994 | Vanderslice et al. ........ 219/209 |
| 5,811,938 A * | 9/1998 | Rodriguez .................... 315/86 |
| 6,339,296 B1 * | 1/2002 | Goral ........................... 315/86 |

* cited by examiner

Primary Examiner—Tuyet T. Vo
(74) Attorney, Agent, or Firm—Wyatt, Tarrant & Combs. L.L.P.

(57) ABSTRACT

An emergency ballast for a fluorescent lamp including a heater disposed adjacent the battery for maintaining the battery at a safe and effective operating temperature during the time which the lamp is powered by the normal AC power supply. Additionally, the ballast includes a charging control circuit which precludes charging of the battery when normal AC power is supplied to the ballast charging circuit during the time when the battery is below a temperature for safe and effective charging.

16 Claims, 2 Drawing Sheets

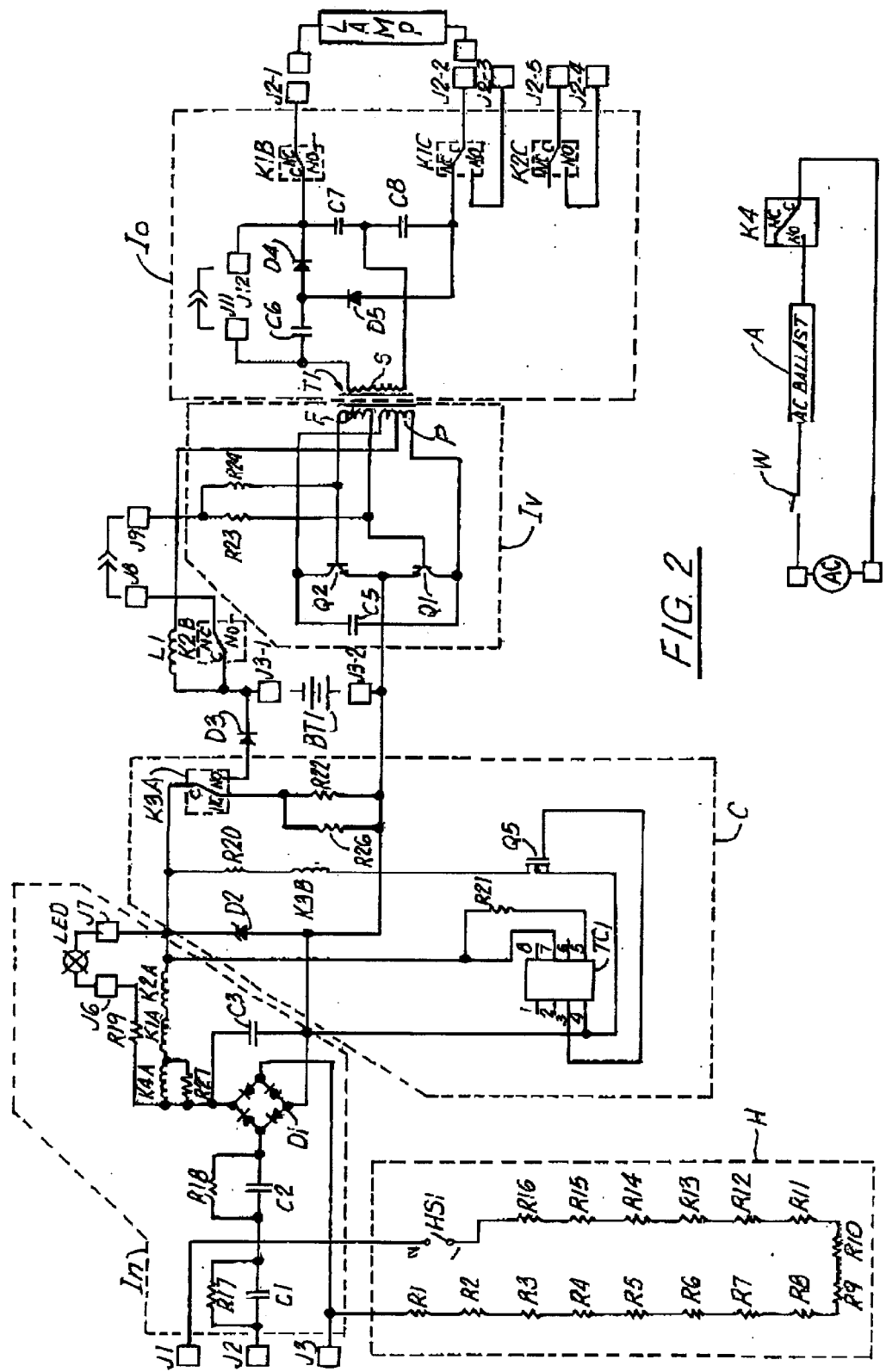

EMERGENCY BALLAST WITH BATTERY HEATER

CROSS-REFERENCE TO RELATED APPLICATION

This application relates to and claims priority from U.S. Provisional Application Ser. No. 60/376,864 filed May 1, 2002.

STATEMENT REGARDING FEDERALLY SPONSORED RESEARCH OR DEVELOPMENT

Not Applicable

BACKGROUND OF THE INVENTION

1. Field of the Invention

The invention relates to emergency lighting, and particularly to fluorescent lighting wherein a fluorescent lamp is connected to a source of electrical energy other than normal AC line current in the event that the normal AC current fails.

Emergency lighting is required in commercial, industrial, and institutional buildings just as fire extinguishers, smoke alarms and other safety equipment. Three types of emergency lighting are common in such installations: unit equipment, engine generators and central battery systems. Unit equipment falls into two principle types: fluorescent and incandescent.

The fluorescent emergency units are customarily combined or within a conventional fluorescent lighting unit by merely adding the emergency ballast consisting of a battery, a battery charger, inverter and sensing circuitry adjacent the standard fluorescent AC ballast. The sensing circuit of the emergency ballast observes the interruption of normal AC power to the lamp unit and immediately switches on the emergency ballast to power individual lamp(s) or the light fixture for the required period. Under most state safety codes, this is a period of at least ninety (90) minutes, a standard called out in the National Electrical Code, NFPA Article 70, and NFPA Article 101 Light Safety Code.

2. General Background of the Invention

U.S. Pat. No. 5,004,953 entitled Emergency Lighting Ballast for Compact Fluorescent Lamps with Integral Starters, assigned to the assignee of the present invention is illustrative of the general fluorescent type of emergency lighting with a ballast. It is common in the installation of emergency fluorescent lighting that an emergency ballast is added to a conventional fluorescent fixture or provided integrally in a fixture having internal regular and emergency ballast installed. When main AC power fails, voltage sensing circuitry instantly connects DC current from a battery (in the emergency ballast) to an inverter which produces high frequency, high voltage power to illuminate the fluorescent lamp(s) in emergency mode for the required period.

The present invention is directed to fluorescent lighting fixtures which are likely to be exposed to extreme low temperatures wherein the battery which supplies the power for lighting when main AC power fails is apt to freeze. Until now, emergency lighting has been utilized in such as commercial an governmental buildings wherein it is unlikely that power will be out for such a long period of time that the batteries for providing the back-up power will freeze. The state of the art units typically are recommended for temperature ranges of about 0° C. to about 50° C. Unit contained emergency fluorescent lighting is now so reliable and common that it is being considered for such as smaller out buildings, garages, outside staircases and warehouses where the building (or fluorescent unit) is unheated, or if subjected to prolonged power outage during winter, the internal environment may cool to 0° C. or lower. After a prolonged time at below freezing temperatures, the battery internal to the emergency ballast is likely to freeze. A problem arises when normal AC power is restored and the battery charging circuit of the unit attempts to recharge the battery. With the inclusion of the present invention, emergency fluorescent lighting may be extended to an operating range of about −20° C. to about 50° C.

It is known that rechargeable batteries such as the nickel-cadmium type typically used in fluorescent emergency lighting systems have difficulties in charging when frozen. Charging may be erratic, and at times at rates much higher than the rate recommended by manufacturers for safe operation. There is also a danger that during an erratic charging process that volatile gasses, particularly hydrogen, may build-up and pose the threat of explosion. The present invention provides a heating mechanism for the rechargeable battery which keeps it at a suitable charging temperature during normal operation whether the installation site building is heated or not, enabling the use of the unit in unheated or lesser heated facilities. Further, the heater circuit addition includes means for connecting the charging circuit to an alternate load while the battery comes up to suitable temperature for charging, while keeping the appropriate relays connected so that upon the resumption of AC power, the normal fluorescent lighting may be powered by the AC main power. Once the battery temperature is sensed to be at a sufficient level for safe charging, the charging current is switched to the battery from the alternate load so as to fully recharge the battery.

Those skilled in the art will recognize that alternative approaches to the preferred embodiments of the present invention disclosed herein may be made without departing from the scope of the present invention.

SUMMARY OF THE INVENTION

The present invention is directed to an emergency ballast for operation in extreme temperature conditions where the battery powering the emergency ballast and emergency fluorescent lamp becomes frozen and requires heating to a recognized minimum temperature before safe recharging may be initiated.

One of the objectives of the present invention is to cause the internal battery of the fluorescent emergency ballast to remain in its normal operating temperature range during when main AC power is supplied to the fluorescent lamp.

A further objective of the present invention is to delay the charging of the battery in the emergency ballast after a loss of main AC power during extreme cold wherein the internal temperature of the battery has dropped below the recommended operating temperature, or has frozen, and the battery is heated to a permissible operating range before recharging current is applied.

An alternate objective of the present invention is the inclusion of the described delay in charging the battery when its internal temperature is below recommended, and the inclusion of enabling circuitry to cause the fluorescent fixture to illuminate on the return of main AC power, irrespective of the ambient temperature.

These and other objectives will be evident from the detailed descriptions of the preferred embodiments provided below.

DESCRIPTION OF THE DRAWINGS

FIG. 2 is a circuit diagram of an alternate preferred embodiment of an emergency ballast according to the present invention.

FIG. 3 is a circuit diagram showing the AC ballast and operating relay illustrated in FIG. 2.

DETAILED DESCRIPTION OF THE PREFERRED EMBODIMENTS

Figure 1:
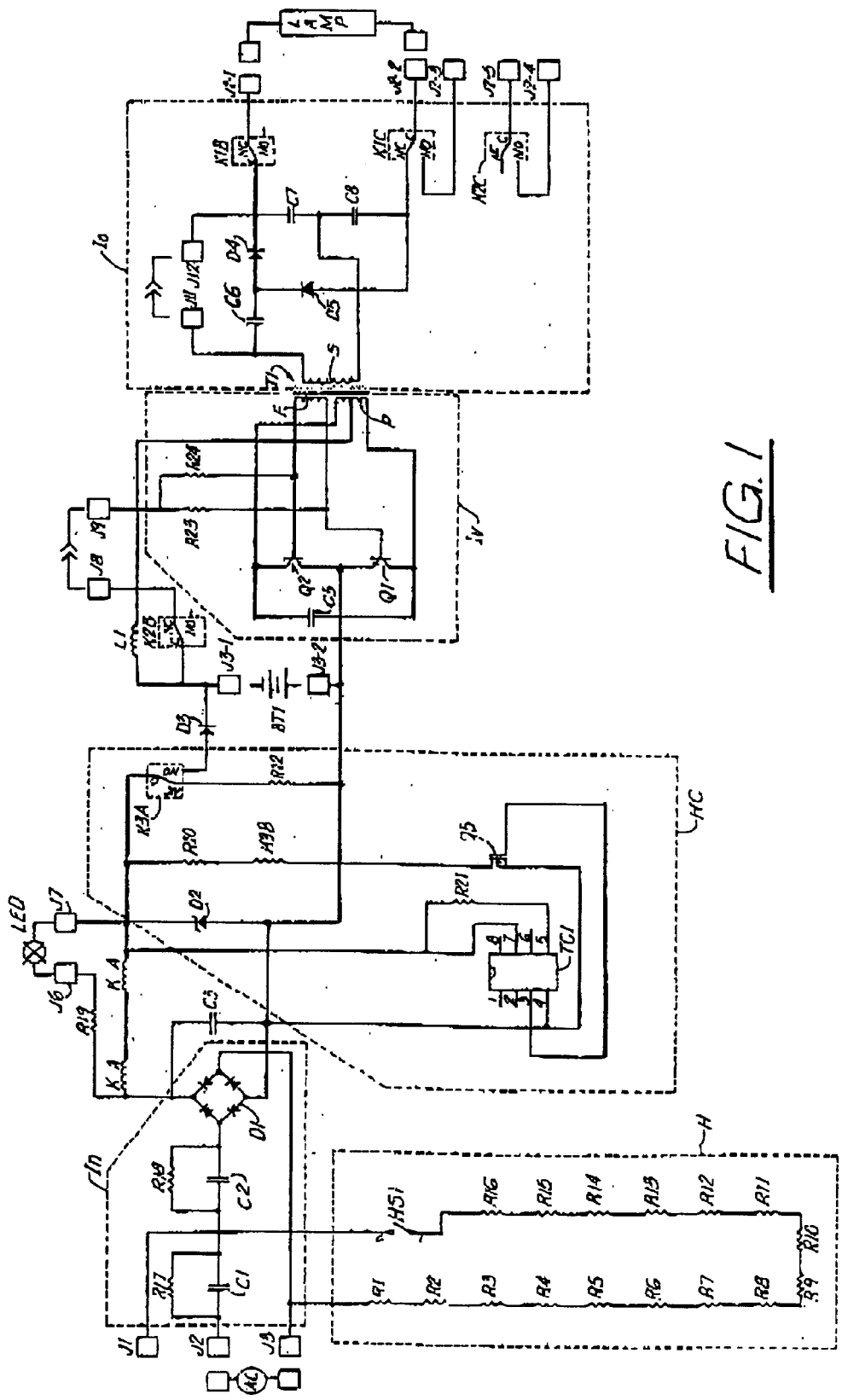
FIG. 1 is a circuit diagram of a preferred embodiment of an emergency ballast according to the present invention.

The invention is illustrated in the context of a conventional fluorescent lamp including an emergency ballast for standby lighting during a period when the main AC power fails. FIG. 1 illustrates the circuit diagram of an emergency ballast according to the present invention which is connected in parallel with a conventional (AC) fluorescent ballast (not shown) for providing emergency lighting in the event of main AC power failure.

The circuitry for an emergency ballast B is illustrated in FIG. 1. If a standard fluorescent ballast be shown, its output would be connected to the fluorescent lamp LAMP, in parallel with the output of the emergency ballast $I_o$. The emergency system includes an input/charging circuit $I_n$ which provides charging current to the battery BT1 and disables the emergency operation mode, i.e., places it in standby during the period that AC power is being supplied. The input/charging circuit has first and second input terminals J-1 and J-2, respectively, connectable to standard AC voltage sources such as 120 AC and 277 volts AC. Inclusion of alternative voltage connections enables the system to be selectively connected to either standard commercial voltage AC (277 volts AC) or normal residential voltage (120 volts AC). Common connector J-3 completes the AC power connections to the system input.

The two AC supply voltage terminals J-1 and J-2 and the common terminal J-3 are connected to the AC inputs of a rectifier D1 (which in the preferred embodiment is a full wave rectifier), the high voltage (277 v. AC) input terminal J-2 being connected by means of a series arrangement of a first circuit composed of a capacitor, C1, and a resistor, R1, and a second circuit composed of a capacitor, C2, and a resistor, R2. The lower voltage (e.g. 120 volts AC) terminal is connected to rectifier D1, only via the second circuit including C2 and R2. The capacitors in the circuits serve to limit the charging current supplied to rectifier D1 to a level consistent with the requirements for a charging current to battery BT1. The resistors are included as a safety measure to limit the discharge of power from the capacitors after the AC power is removed from the circuits.

In a first embodiment (FIG. 1) The DC output from rectifier D1 is supplied to battery BT1 through the coils of two relays, K1A and K2A, and a capacitor C3 which filters the current supplied to relay coils K1A and K2A. A resistor R19 is connected in series with an LED indicator to show the charging status of the emergency ballast B.

In an alternate embodiment illustrated in FIG. 2, the output from rectifier D1 is supplied to battery BT1 through the coils of three relays, K1A, K2A and K4A and a capacitor C3 which filters the current supplied to relay coils K1A, K2A and K4A. Current limiting resistor R19 is connected in series with light emitting diode indicator LED to show the charging status of emergency battery B. Relay coil K4A operates contacts K4 which are in the AC supply current for the AC ballast. By including the extra relay K4 which opens the AC ballast (FIG. 3) when the AC power is reestablished such that the emergency ballast ceases supplying current to the lamp, the transient AC load on contacts K1B and K1C is removed, thereby prolonging their life by reducing the arcing which occurs on the opening of the contacts. As shown in FIG. 3, the AC Ballast A is connected to the building AC supply in series with a conventional wall switch W. Relay K4 interrupts the AC supply to the AC ballast as described below when the battery BT1 is sensed as being outside its operating limits.

Battery BT1 may be composed of, for example, a high temperature nickel-cadmium battery. In the described embodiments, battery BT1 is comprised of 7 C cells and has a nominal voltage of 8.4 volts. Alternate battery configurations are possible, dictated by the power requirements of load LAMP and size of the battery space available in the emergency ballast.

The output circuit $I_o$ includes a secondary winding S of transformer T having a primary winding P and a feedback winding F on the inverter circuit $I_v$ side of transformer T. Output circuit $I_o$ provides current limiting to the fluorescent lamp load LAMP only to the degree that is necessary to keep the lamp within its operating limits. The output $I_o$ circuit also provides switching by switches K1B and K1C and K2C between normal lamp operation (K1A and K2A energized) and the emergency ballast mode (K1A and K2A de-energized) during which the AC power is not available. The output circuit $I_o$ is composed of a capacitor, C6, connected in series with the output of the secondary winding, S, of transformer T1. Capacitors C7 and C8 are selectively connected as discussed later, in series with the fluorescent lamp LAMP which the output circuit $I_o$ powers. As may be observed by those skilled in the art, the output circuit is remarkably simple in that the output circuit of the emergency ballast B provides only that current limiting necessary to keep the fluorescent lamp within its operating limits and allows the lamp to be connected to DC voltage from rectifying/doubling circuit (D4, D5, C7, C8) and created from the energy supplied by battery BT1 through switching performed by the inverter circuit $I_v$.

In emergency mode, emergency power is supplied to load LAMP by battery BT1 through the operation of inverter circuit $I_v$. The inverter circuit $I_v$ is placed in operation by enabling the oscillation of switching transistors Q1 and Q2. Those familiar with fluorescent lighting will recognize that an application of an initial voltage of as much as approximately 600 volts may be required to initiate the ignition of the gasses in the standard fluorescent lamp. Immediately after ignition, as battery BT1 through coil L1 and resistors R23 and R24 supplies base current to Q1 and Q2, as later discussed, the current regulating capacitors C7 or C8 in the output circuit $I_o$ regulate the current level to that required to operate the fluorescent lamp at reduced illumination.

The inverter $I_v$ constitutes a current-fed, self-resonant, switch-mode converter supply, also known as a push-pull converter which includes primary P of transformer T1, the transformer having an inductance setting gap in its core. Transformer T1 is composed of a center tapped primary winding P, a feedback winding F and a high-voltage secondary winding S, composed of a large number of turns of fine magnetic wire. Two transistors, Q1 and Q2, are connected so that the collector/emitter pad of each is connected between a respective end of the primary winding P and the negative terminal battery BT1 as shown. A low-voltage feedback winding, F, of transformer T1 is connected between the bases of transistors Q1 and Q2 to provide positive feedback from winding F to cause Q1 and Q2 to alternately switch the battery current through primary winding P1 creating the alternating current in secondary winding S.

Battery heater H is connected to main AC supply J1 or J2 and common J3 and in the illustrated embodiment is composed of a sequential line of heater resistors R (R1 through R16), physically disposed over an area above which the battery BT1 is positioned such that the heat dissipated by the resistors as a result of the AC current flow rises to warm battery BT1. Included in series with heater resistors R is heater switch HS, which in the illustrated embodiment is a simple bimetallic switch, such as a Phillips/Air Pak 67LO40, which operates to control the flow of current through the heater resistors R when the ambient temperature at the switch reaches a level where heating of the battery BT1 will extend its operating range in event the temperature around the fluorescent fixture should drop below the recommended operating limits for the battery. In the illustrated embodiment, heater switch HS closes at about 25° C. initiating AC current flow and opens at about 40° C., suspending heater H operation. As will be understood by those skilled in the art, should main AC power fail, there will be no functioning of the heater H, irrespective of the open or closed position of heater switch HS. In the alternative, numerous other electrical devices which produce heat during operation may be utilized in place of the illustrated resistor bank (R1 through R16) such as thermisters.

Charge control circuit C regulates charging of battery BT1 to occur only during those periods when the battery BT1 is at a suitable temperature to be safely and effectively charged. Inclusion of control circuit C enables the utilization of fluorescent emergency ballasts in environments not previously considered suitable for effective operation of the emergency ballasts. Control circuit C includes diode D2 (a 15 V Zener diode) across the output of rectifier D1 to limit potentially damaging high voltage when the K3A contacts are switching. Control circuit including resistor R20, relay coil K3B, charge activation switch Q5, and temperature control TC including controller TC1 and precision resistor R21 (for setting the temperature value for activation). Relay coil K3B activates switch K3A when current flows through coil K3B by virtue of temperature controller TC1 activating switch Q5 to close the circuit to rectifier D1. Battery BT1 is then connected to rectifier D1 so that the charging current will flow and recharge the battery BT1. In the illustrated embodiment, temperature controller TC1 is physically located on the ballast circuit board (not shown) which is under the battery BT1 package. TC1 is disposed adjacent the battery BT1 in order to sense the temperature of the battery BT1. As previously described, heater H operates (so long as AC power is being supplied to ballast B) when switch S1 is below about 40° C. to bring battery BT1 to a safe charging temperature. TC1 senses the battery BT1 temperature and actuates when heat generated in heater H has raised the temperature of battery to a safe charging level (25° C.) thereby causing transistor Q5 to conduct and cause a current to flow through relay coil K3B and activate switch K3A to connect the charging current of rectified D1 to battery BT1. Since rectifier D1, upon return of main AC current, will only be connected to battery BT1 by switch K3A when the temperature of the battery BT1, as measured by TC1 adjacent the battery, is at a temperature for safe and effective charging.

In the embodiment described above and illustrated in FIG. 1, the following components were utilized:

| Designator | Description | Component value/description |
|---|---|---|
| A | AC Ballast | |
| C1 | capacitor | 3.3 uF |
| C2 | capacitor | 4.0 uF |
| C3 | capacitor | 220 uF/35 VDC |
| C5 | capacitor | 0.1 uF/100 V |
| C6 | capacitor | 820 pF/2 kVDC |
| C7 | capacitor | 470 pF/2 kVDC |
| C8 | capacitor | 820 pF/2 kVDC |
| R1–R16 | resistor | 120Ω/1.0 W |
| R17 | resistor | 10 MΩ/0.25 W |
| R18 | resistor | 10 MΩ/0.25 W |
| R19 | resistor | 270Ω/0.25 W |
| R20 | resistor | 1 kΩ/0.5 W |
| R21 | resistor | 113 kΩ/0.25 W (1% resistor) |
| R22, R26 | resistor | 130Ω/2 W |
| R23 | resistor | 1 kΩ/0.5 W |
| R24 | resistor | 1 kΩ/0.5 W |
| R25 | resistor | 10 kΩ/0.25 W |
| R27 | resistor | 62Ω/1 W |
| D1 | diode bridge | 1 A, 600 V |
| D2 | Zener diode | 15 VDC/5 W |
| D3 | diode, 1N4005 | 1 A, 600 V |
| D4 | diode, FRO5-31 | |
| D5 | diode, FRO5-31 | |
| K1A, K2A | DPDT relay | 3 V, 166 mA coil |
| K3 | SPDT relay | 5 V, 370Ω coil |
| K4A | SPDT relay | 5 V, 90 mA coil |
| Q1, Q2 | transistor ZTX-851 | 60 V, 5.0 A |
| Q5 | mosfet VN2222 | 60 V, 0.15 A |
| BT | nickel-cadmium battery | 8.4 V, 2.5 Ah, C cell |
| HS1 | thermostat switch | Phillips/Airpax 67LO40 |
| TC1 | temperature control | TC622EPA |
| W | Wall switch | |
| T1 | E187 inverter transformer: | |

| Winding Description | Wire Gauge | Number of Turns |
|---|---|---|
| Secondary | 34 | 500 |
| Primary | 25 | 8 |
| Primary | 25 | 8 |
| Feedback | 25 | 2 |

The disclosed embodiment is to be considered in all respects as illustrative and not restrictive. The scope of the invention is to be defined by the appended claims rather than the foregoing descriptions and other embodiments which come into the meaning and range of equivalency of the claims are therefore intended to be included within the scope thereof.

What is claimed is:

1. A fluorescent type emergency lighting ballast including circuit means for emergency operation of a fluorescent lamp with power supplied by a battery, when power normally supplied to said fluorescent lamp from a standard fluorescent AC ballast, powered by normal AC power mains is interrupted and the lamp's standard fluorescent ballast is disabled, comprising:

a) a rectifier charging circuit adapted to be connected to be powered by the normal AC power supply to the standard fluorescent ballast during normal operation of the normal AC power supply, said charging circuit disconnectably connected to said battery while the normal AC power supply is providing AC power to the lamp;

b) an inverter disconnectably connected to said battery upon disenabling of said rectifier charging circuit charging said battery, the output of said inverter switchably oscillating the voltage of said battery to create an AC output current, and including a transformer to step up said inverter created AC voltage to a predetermined level to operate the fluorescent lamp, said inverter disconnectably connected to the fluorescent lamp during the period said inverter is powered by said battery;

c) a battery charging control circuit connected to the rectifier charging circuit and the battery, the control circuit including a temperature sensitive switch disposed adjacent the battery, said switch disconnecting the charging circuit from the battery when the temperature sensed by the switch is below a predetermined level;

whereby the battery is charged only when it is at or above the temperature sensed by the switch.

2. The emergency ballast of claim 1 wherein said ballast includes a heater having a heating element disposed adjacent the battery charged by the charging circuit and the heating element supplies heat to the battery so long as the normal AC power is supplied to the rectifier charging circuit.

3. The emergency ballast of claim 2 wherein said heater has a heating element comprising a network of heat generating electrical devices disposed adjacent to the battery.

4. The emergency ballast of claim 3 wherein said heating element network includes active heat generating temperature controlled devices.

5. The emergency ballast of claim 3 wherein said heating element network includes passive heat generating temperature controlled devices.

6. The emergency ballast of claim 3 wherein said heater is comprised of a series of electrical resistors disposed adjacent the battery.

7. The emergency ballast of claim 2 wherein said heater has a heating element comprising a resistive wire disposed adjacent to the battery.

8. The emergency ballast of claim 2 wherein said heater has a heating element comprising a foil heating strip disposed adjacent to the battery.

9. A fluorescent type emergency lighting ballast including circuit means for emergency operation of a fluorescent lamp with power supplied by a battery, when power normally supplied to said fluorescent lamp from a standard fluorescent AC ballast, powered by normal AC power supply is interrupted and the lamp's standard fluorescent ballast is disabled, comprising:

a) a rectifier charging circuit adapted to be connected to be powered by the normal AC power supply to the standard fluorescent ballast during normal operation of the normal AC power supply, said charging circuit disconnectably connected to said battery while the normal AC power supply is providing AC power to the lamp;

b) an inverter disconnectably connected to said battery upon disenabling of said rectifier charging circuit charging said battery, the output of said inverter switchably oscillating the voltage of said battery to create an AC output current, and including a transformer to step up said inverter created AC voltage to a predetermined level to operate the fluorescent lamp, said inverter disconnectably connected to the fluorescent lamp during the period said inverter is powered by said battery;

c) a heater having a heating element disposed adjacent to the battery and powered by the AC power supply;

whereby the heating element supplies heat to the battery so long as the AC power supply is not interrupted.

10. The emergency ballast of claim 9 wherein said ballast includes a heater having a heating element disposed adjacent the battery charged by the charging circuit and the heating element supplies heat to the battery so long as the normal AC power is supplied to the rectifier charging circuit.

11. The emergency ballast of claim 10 wherein said heater has a heating element comprising a network of heat generating electrical devices disposed adjacent to the battery.

12. The emergency ballast of claim 11 wherein said heating element network includes active heat generating temperature controlled devices.

13. The emergency ballast of claim 11 wherein said heating element network includes passive heat generating temperature controlled devices.

14. The emergency ballast of claim 10 wherein said heater has a heating element comprising a series of electrical resistors disposed adjacent to the battery.

15. The emergency ballast of claim 10 wherein said heater has a heating element comprising a resistive wire disposed adjacent to the battery.

16. The emergency ballast of claim 10 wherein said heater has a heating element comprising a foil heating strip disposed adjacent to the battery.

* * * * *